United States Patent [19]

Ujiie et al.

[11] Patent Number: 5,781,352
[45] Date of Patent: Jul. 14, 1998

[54] OBJECTIVE LENS SUPPORTING DEVICE

[75] Inventors: Masahiko Ujiie; Toshinori Chino; Rikio Tsuchiya; Hirotoshi Sugiura, all of Shizuoka, Japan

[73] Assignee: Minebea Co., Ltd., Nagano, Japan

[21] Appl. No.: 695,937

[22] Filed: Aug. 12, 1996

[30] Foreign Application Priority Data

Aug. 11, 1995 [JP] Japan ................................. 7-205993

[51] Int. Cl.⁶ ...................................................... G02B 7/02
[52] U.S. Cl. ........................ 359/824; 359/814; 369/44.15
[58] Field of Search ................................ 359/813, 814, 359/823, 824, 822; 369/44.15, 44.16

[56] References Cited

U.S. PATENT DOCUMENTS

| | | | |
|---|---|---|---|
| 4,766,583 | 8/1988 | Oinoue et al. | 359/824 |
| 4,887,888 | 12/1989 | Nose . | |
| 4,969,715 | 11/1990 | Nishihara et al. . | |
| 5,007,712 | 4/1991 | Kikuchi et al. | 359/823 |
| 5,050,964 | 9/1991 | Mori | 359/813 |
| 5,103,344 | 4/1992 | Yamamoto | 359/813 |
| 5,103,345 | 4/1992 | Watanabe et al. | 359/813 |
| 5,206,762 | 4/1993 | Kasahara et al. | 359/814 |
| 5,231,541 | 7/1993 | Han | 359/814 |
| 5,243,584 | 9/1993 | Kang | 369/44.14 |
| 5,313,334 | 5/1994 | Tomiyama et al. | 359/824 |
| 5,414,680 | 5/1995 | Ikegame | 369/44.14 |
| 5,442,490 | 8/1995 | Suzuki | 359/824 |

FOREIGN PATENT DOCUMENTS

| | | |
|---|---|---|
| 0 212 941 | 3/1987 | European Pat. Off. . |
| 0 343 979 | 11/1989 | European Pat. Off. . |
| 0 371 799 | 6/1990 | European Pat. Off. . |
| 0 382 553 | 8/1990 | European Pat. Off. . |
| 0 410 715 | 1/1991 | European Pat. Off. . |
| 0 617 418 | 9/1994 | European Pat. Off. . |

*Primary Examiner*—Loha Ben
*Attorney, Agent, or Firm*—Staas & Halsey

[57] ABSTRACT

An objective lens supporting device having its tracking sensitivity in the focusing direction improved by separating the center of gravity of the moving portion for the objective lens at the time when it moves in the focusing direction from each other and having vibration of the objective lens occurring when the device is subjected to an external force due to an acceleration accompanying a movement of the optical pickup suppressed, the objective lens supporting device, further, being quite excellent in the optical disk tracking characteristic of the optical pickup device and capable of achieving cueing of an information signal on an optical disk in a very short time. The object of the invention is achieved by a structure comprising a lens retaining member for retaining an objective lens, a support member for supporting the lens retaining member for movement along the optical axis of the objective lens, and a supporting base supporting the support member, supported on a bed plate by a hinge portion, and allowing the lens retaining member to move in the tracking direction, and having the center of gravity of the entire body of the moving portion supported by the hinge portion positioned on the axial line of the hinge portion and the center of gravity of the lens retaining member positioned on the optical axis of the objective lens.

6 Claims, 6 Drawing Sheets

EXTERNAL FORCE

FIG. 7

$W_O = \sqrt{K/M}$

$S_{DC} = (n l B) / K$

- n : COIL NUMBER OF TURNS
- l : COIL EFFECTIVE LENGTH
- b : MAGNETIC FLUX DENSITY

TRACKING/FOCUS CENTER OF GRAVITY

FIG. 10

TRACKING/FOCUS CENTER OF GRAVITY

FIG. 11

TRACKING/FOCUS CENTER OF GRAVITY

OBJECTIVE LENS SUPPORTING DEVICE

BACKGROUND OF THE INVENTION

1. (Field of the Invention)

The present invention relates to an objective lens supporting device for use in optical pickups.

2. (Description of the Prior Art)

Figure 9:
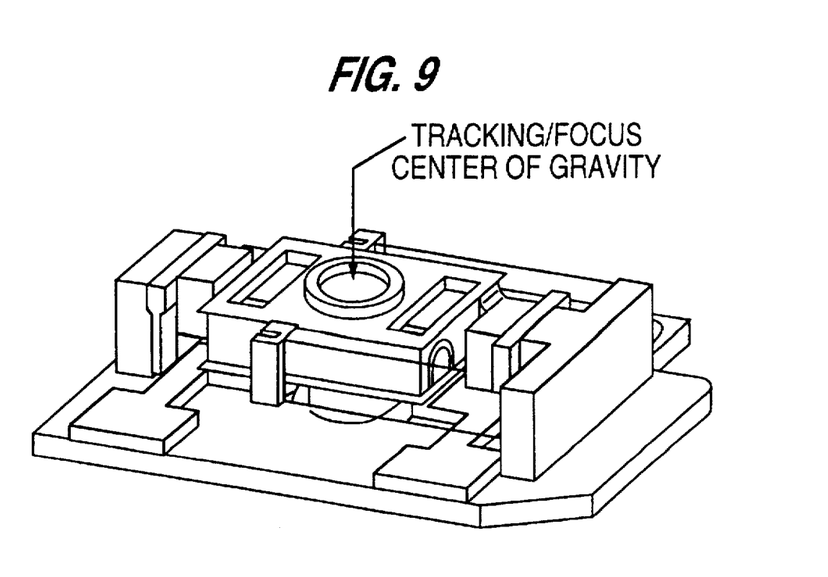
FIG. 9 is a perspective view showing a prior art example.
Figure 10:
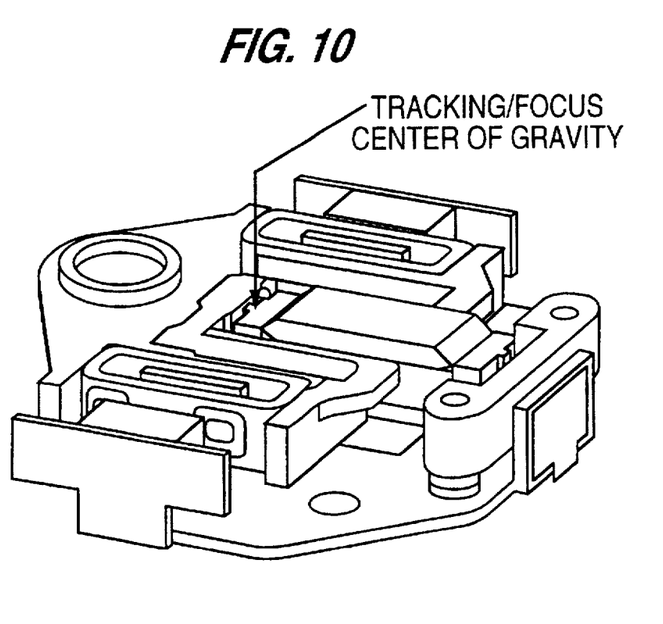
FIG. 10 is a perspective view showing a prior art example.
Figure 11:
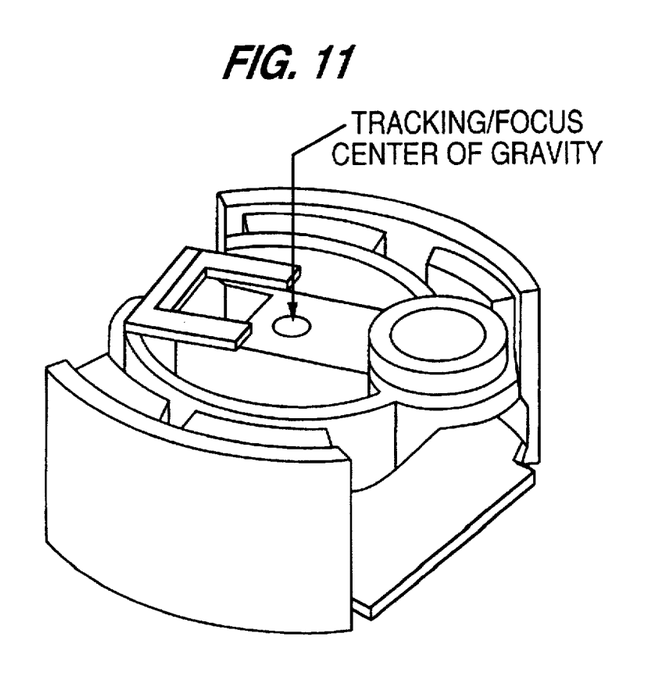
FIG. 11 is a perspective view showing a prior art example.

Optical pickups are used for reading and/or writing data on an optical disk apparatus and a compact disk apparatus as auxiliary memory for personal computers. The objective lens supporting device for optical pickup is a device that allows the objective lens to achieve tracking adjustment for an optical disk with a facial warp or an eccentricity so that the light-beam is focused on the signal plane of the disk at all times. Supporting devices of a 4-wire type as shown in FIG. 9, of a hinge type as shown in FIG. 10, or of an axial slide type as shown in FIG. 11 have been used conventionally. In these supporting devices, since the center of gravity of the moving portion for the objective lens moving in the focusing direction to achieve tracking adjustment for a disk with a facial warp and the center of gravity of the moving portion for the objective lens moving in the tracking direction to achieve tracking adjustment for a disk with an eccentricity are in the same position, due consideration has not been give to attain both improvement of the tracking sensitivity and removal of vibration of the moving portion for the objective lens occurring when the device is subjected to an external force due to an acceleration accompanying a movement of the optical pickup.

SUMMARY OF THE INVENTION

Accordingly, an object of the invention is to provide an objective lens supporting device having excellent tracking sensitivity in the focusing direction and a plane direction of a disk.

The invention is made under the situations as described above and in the invention it is aimed to provide an objective lens supporting device having tracking sensitivity in the focusing direction improved by separating the center of gravity of the moving portion for the objective lens at the time when it moves in the tracking direct ion and the center of gravity of the moving portion for the objective lens at the time when it moves in the focusing direction from each other and having vibration of the objective lens occurring when the device is subjected to an external force due to an acceleration accompanying a movement of the optical pickup suppressed, the objective lens supporting device, further, being quite excellent in the optical disk tracking characteristic of the optical pickup device and capable of achieving cueing of an information signal on an optical disk in a very short time.

The present invention provides an objective lens supporting device for optical pickup comprising a lens retaining member for retaining an objective lens, support means for supporting the lens retaining member for movement along the optical axis of the objective lens, and a supporting base supporting the support means, supported on a bed plate by means of a hinge portion, and allowing the lens retaining member to move in the tracking direction, and having the center of gravity of the entire body of the moving portion supported by means of the hinge portion positioned on the axial line of the hinge portion and the center of gravity of the lens retaining member positioned on the optical axis of the objective lens.

In the present invention, the support means for supporting the lens retaining member for movement along the optical axis of the objective lens has a plurality of plate-type resilient spring plates arranged in parallel and placed in planes parallel to the tracking surface, and the spring plates support the lens retaining member at their one ends and are held by the supporting base at their other ends. Further, the hinge portion is provided in a joint portion formed between and integrally with a connection base fixed on the bed plate and the supporting base, which is a portion of the moving portion, the joint portion including the hinge portion and the supporting base are integrally formed of a flexible synthetic resin, and, further, the hinge portion is linearly formed along a tangential line portion between an edge sharply projecting from the supporting base and the connection base. Besides, the supporting base is provided with a balance whose weight can be increased or decreased for balance adjustment of the center of gravity for the tracking direction.

In the present invention constructed as described above, the center of gravity at the time of movement in the tracking direction is positioned in the hinge portion located in the center of the entire body of the moving portion and the center of gravity at the time of movement in the focusing direction is positioned on the optical axis of the objective lens. While an external force due to an acceleration is applied to it when the optical pickup is moved in the tracking direction, since the center of gravity is positioned in the center of the entire body of the supporting member, the balance in the tracking direction is maintained. Accordingly, vibration of the objective lens can be controlled. As to the movement of the objective lens in the tracking direction to achieve tracking adjustment for a disk with an eccentricity, since the lens retaining member rotates around the hinge portion, the tracking adjustment in the tracking direction can be achieved by the objective lens without inclining.

In the focusing direction, since the center of gravity of the lens retaining member for retaining the objective lens is positioned on the optical axis of the objective lens, the moving portion can be made lighter in weight and the tracking sensitivity can be improved. As to the movement of the objective lens in the focusing direction to achieve tracking adjustment for a disk with a facial warp, since parallel movement is achieved by means of the spring plates arranged in parallel, the objective lens can achieve the tracking adjustment in the focusing direction without inclining. Since synthetic resin, metallic spring, and the like is used for the supporting portion of the objective lens, the tracking adjustment can be achieved with a small electric current.

DESCRIPTION OF THE PREFERRED EMBODIMENTS

Figure 1:
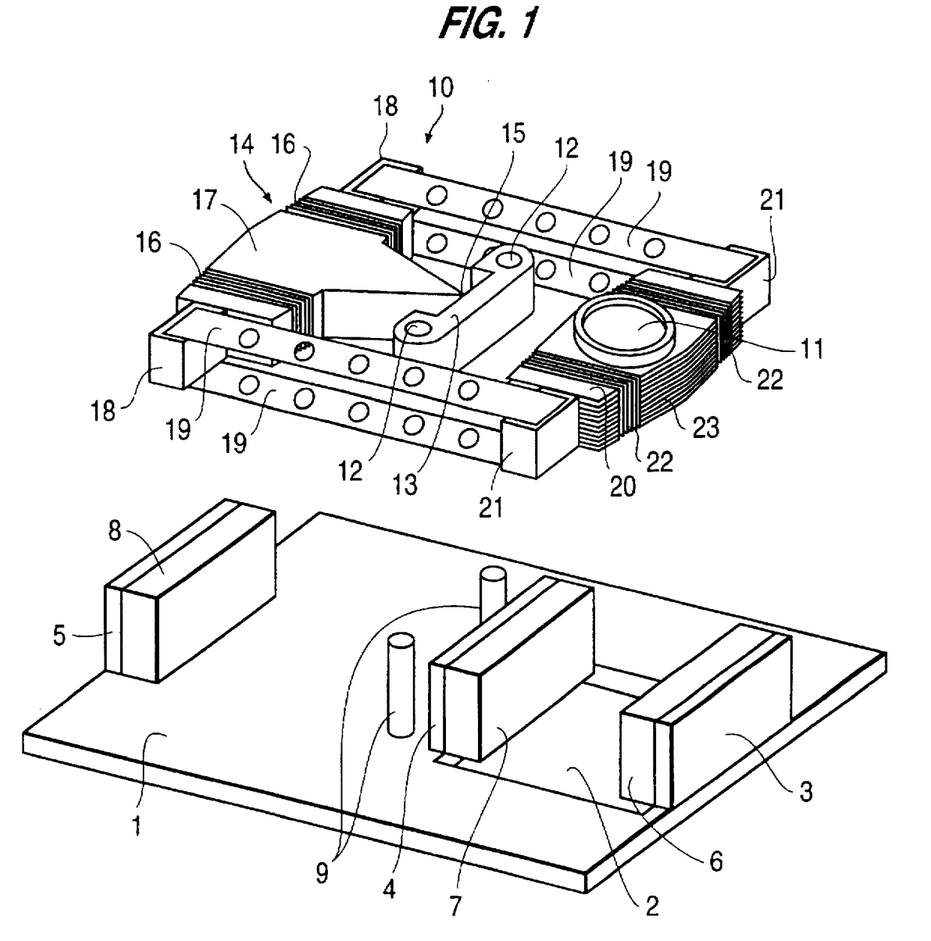
FIG. 1 is an exploded perspective view showing an embodiment of the invention.

An embodiment of the present invention will be described in detail with reference to the accompanying drawings. FIG. 1 is an exploded perspective view of the embodiment of the invention. Referring to FIG. 1, reference numeral 1 denotes a bed plate formed of a nonmagnetic metallic plate. In the bed plate 1 around its one end, there is made a square through hole 2. On the periphery of the through hole 2, there are provided magnet supporting pieces 3 and 4 being cut and raised up. In the bed plate 1 around its other end, there also is provided a magnet supporting piece 5 cut and raised up. Permanent magnets 6, 7, and 8, formed of ferrite or rare earth, are fixedly attached to the magnet supporting pieces 3, 4, and 5, cut and raised up from the bed plate 1, respectively. Virtually in the center of the bed plate 1 and adjacent to the magnet supporting piece 4, there are provided spaced apart two moving portion holding pins 9, 9 in upright positions.

Reference numeral 10 denotes a moving portion for supporting an objective lens 11. In the center of the moving portion 10, there is disposed a connection base 13 in a spectacle form having two holes 12, 12 to be fitted on the moving portion holding pins 9, 9. There is provided a supporting base 14 having its tip end linearly joined to the connection base 13 at the center of it. The linear joint portion forms a hinge portion 15. The supporting base 14 has, at its portion next to the edge, a movable yoke 17 around which a tracking coil 16 is wound. Arms 18, 18 extend from both sides of the movable yoke 17.

The connection base 13, the movable yoke 17 including the edge of the supporting base 14, and the arms 18, 18 are integrally formed by synthetic resin molding. The material used is for example polycarbonate resin having excellent flexibility. Four spring plates 19, 19, 19, 19 horizontally extend from the obverse and the reverse of the arms 18, 18, respectively. The spring plate 19 is formed of a thin plate of a metallic spring material such as phosphor bronze and beryllium copper or a synthetic resin containing carbon fiber and having good resiliency, and it has holes made therein to weaken the spring force.

The front ends of the spring plates 19 are fixed to arms 21, 21, respectively, of a lens retaining member 20. The objective lens 11 is inserted in the center of the lens retaining member 20. The lens retaining member 20 is provided with tracking coils 22, 22 wound around it in the same direction as the tracking coil 16 and a focus coil 23 wound in the direction orthogonal to the tracking coil 22.

Figure 2:
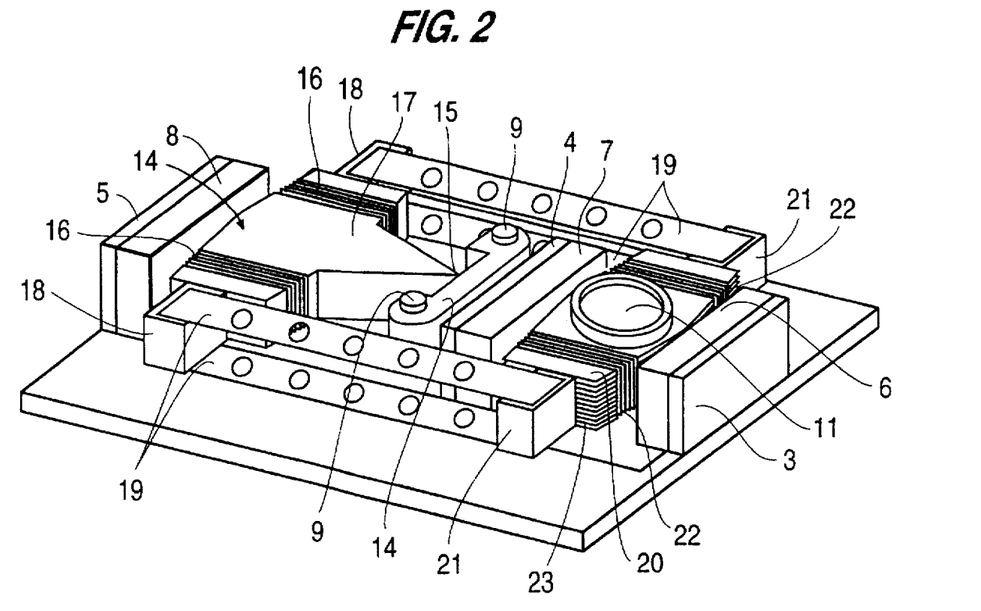
FIG. 2 is a perspective view of the embodiment of the invention.

The moving portion 10 structured as described above is brought over the bed plate 1 and the moving portion 10 is set up on the bed plate 1 with the moving portion holding pins 9, 9 provided upright on the bed plate 1, inserted into the holes 12, 12 made in the connection base 13. FIG. 2 is a perspective view showing the objective lens supporting device structured by assembling the bed plate 1 and the moving portion 10. In the state as assembled, the entire body of the moving portion 10 of the objective lens supporting device is rotatable around the axial line of the hinge portion 15 and in a plane parallel to the plane of the bed plate 1. Since the lens retaining member 20 is in a plane parallel to the bed plate 1 and held by the four parallel spring plates 19, the lens retaining member 20 can move in the direction parallel to the axial line of the hinge portion 15. Further, the optical axis of the objective lens 11 is in parallel with the axial line of the hinge portion 15.

In the structure shown in FIG. 2, a magnetic circuit for the focus direction is formed by the permanent magnet 6 and the permanent magnet 7. Further, a magnetic circuit for the tracking direction is formed by the permanent magnet 6 and the permanent magnet 8. The center of gravity of the entire body of the moving portion 10 is in agreement with the axial line of the hinge portion 15. The lens retaining member 20 is held by the supporting base 14 and the four parallel plate springs and allowed to move only in the focusing direction. Further, the center of the entire body of the lens retaining member 20 is in agreement with its center of gravity and the objective lens is fixed in the same position.

Figure 3:
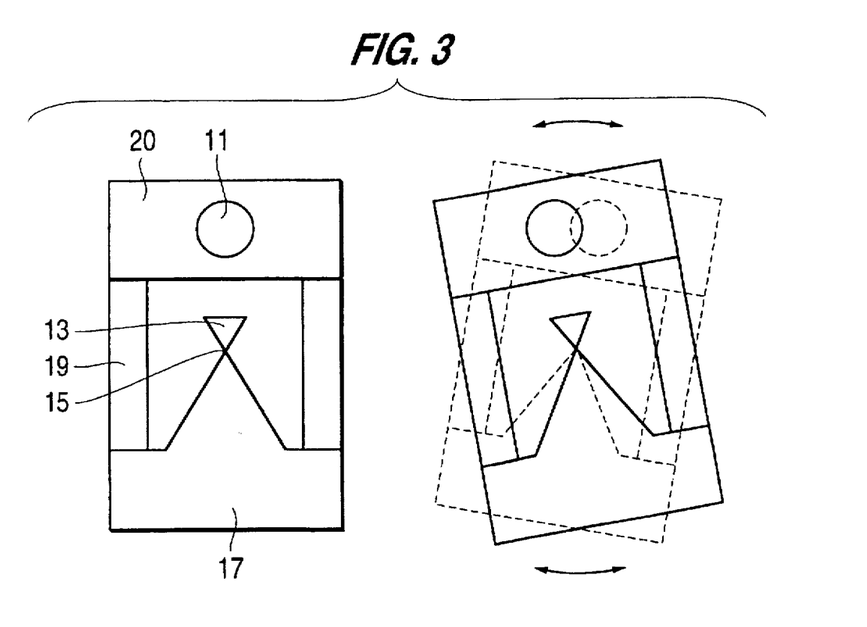
FIG. 3 is an explanatory drawing of movement in the tracking direction.
Figure 4:
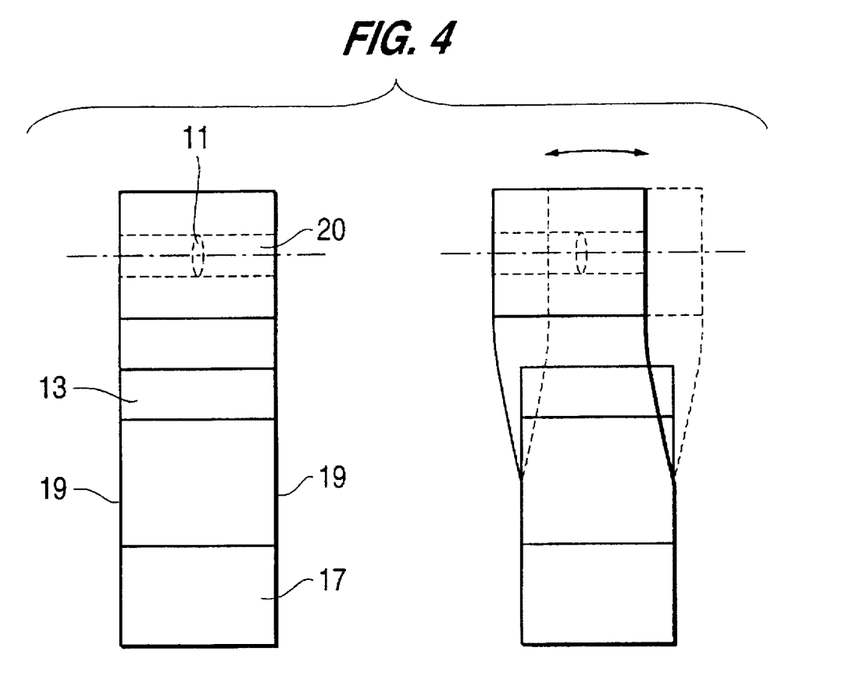
FIG. 4 is an explanatory drawing of movement in the direction of the optical axis.

A movement of the objective lens 11 in the tracking direction is achieved by flowing a current through the tracking coils 16, 16 wound around the movable yoke 17 and the tracking coils 22, 22 wound around the lens retaining member 20, with respect to the magnetic circuit formed of the permanent magnet 6 and the permanent magnet 8. By the current flow through these tracking coils, the entire body of the moving portion 10 can be moved rotatively round the axial line of the hinge portion 15 as shown in FIG. 3. A movement of the objective lens 11 in the focusing direction is achieved by flowing a current through the focusing coil wound around the lens retaining member 20, with respect to the magnetic circuit formed of the permanent magnets 6 and 7, and, thereby, the lens retaining member 20 can be moved parallel to the optical axis of the objective lens 11 as shown in FIG. 4.

Figure 5:
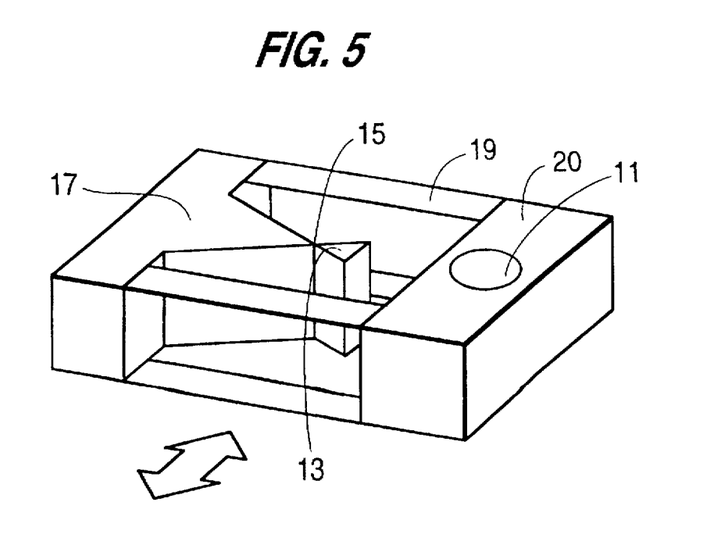
FIG. 5 is a perspective view showing a state where an external force is applied in the tracking direction.
Figure 6:
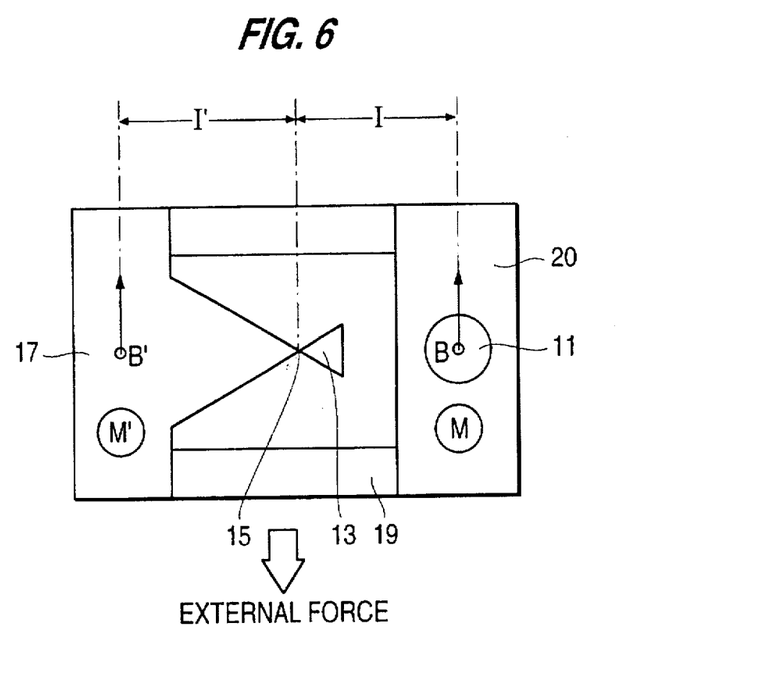
FIG. 6 is an explanatory drawing of reaction forces and moments due to application of an external force.
Figure 7:
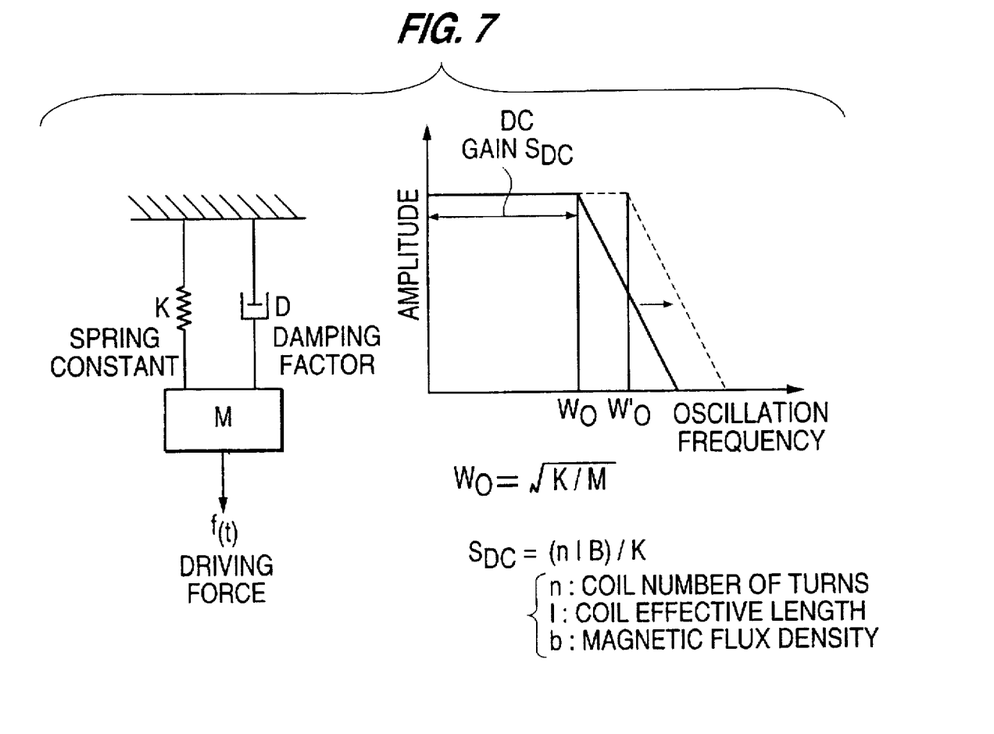
FIG. 7 is a model diagram of the system of the lens retaining member 20.

When an external force due to an acceleration produced by a movement of the optical pickup in the tracking direction is applied to the objective lens supporting device as indicated by the arrow in FIG. 5, no vibration is produced in the objective lens 11 retained in the lens retaining member 20 because it is arranged in the present invention, as shown in FIG. 6, such that $l \times M = l' \times M'$, where M represents mass of the lens retaining member 20, M' represents mass of the supporting base 14, and $l$ and $l'$ represent distances from the centers of gravity B and B' of the moving portion 10, i.e., such that moments of both of the members are equal and the external force is uniformly applied to both of them. Regarding the focusing direction, since it is only required that the relationship $l \times M = l' \times M'$ always holds, where M represents mass of the lens retaining member 20, M' represents mass of the supporting base 14, and $l$ and $l'$ represent distances from the centers of gravity of these members as shown in FIG. 6, it becomes possible to lighten the mass M of the lens retaining member 20. When mass of the lens retaining member 20 is represented by M, the spring constant of the system of the lens retaining member 20 is represented by K, and the damping factor of the same is represented by D, a model of the system of the lens retaining member 20 can be obtained as shown in FIG. 7. By lessening the mass M of the lens retaining member 20, the oscillation frequency of the system of the lens retaining member can be raised from W to WO. Consequently, the tracking sensitivity coping with an acceleration can be improved.

Figure 8:
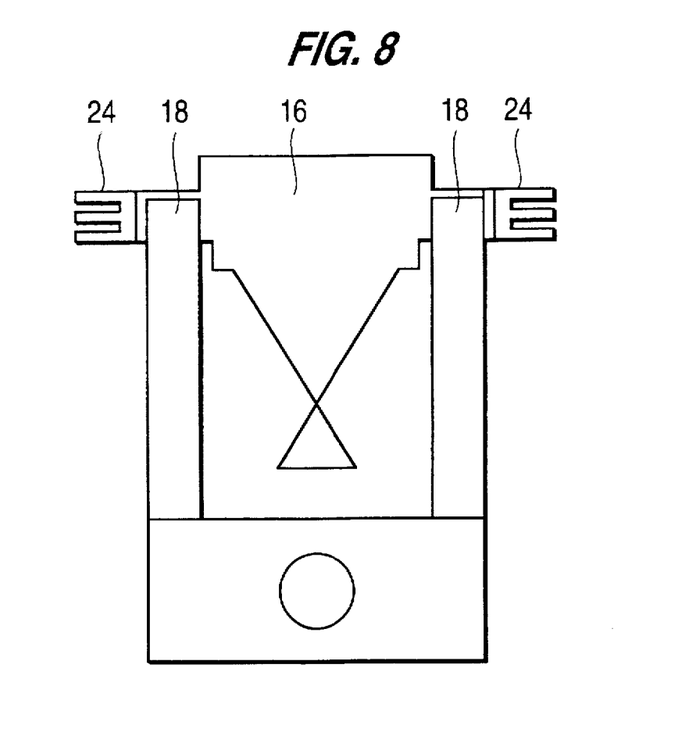
FIG. 8 is a front view showing another embodiment of the invention.

In the above mentioned embodiment, the description has been made on the assumption that the balance in the tracking direction was adjusted when the objective lens supporting device for optical pickup according to the invention was assembled. In reality, however, there exists some imbalance on account of a minute displacement of the coil and the like. While such a displacement is negligibly small, another embodiment of the invention to be described below can absorb even such a minute imbalance. As shown in FIG. 8, fin-formed balancers 24, 24 are provided on both sides of the arms 18, 18. Balancing in the tracking direction is of course provided at the twit of designing with the balancer taken into consideration. However, when there exists a minute imbalance after completion of the assembly, the minute imbalance in the tracking direction is adjusted by increasing or decreasing the weight of the balancer 24. Namely, when M'>M, a certain amount of a portion of the balancer 24 is cut off with a cutting tool such as nippers. When M'<M, a certain amount of a weight adjusting material such as adhesive agent is poured into a portion of the fins of the balancer 24 and solidified. At this time, such an adhesive agent that, when it is solidified, its portion of the solvent causes a loss in weight cannot be used.

According to the present invention, since it rotatively moves in the tracking direction with a balanced state maintained, vibration of the objective lens can be suppressed even if it is subjected to an external force due to an acceleration produced by the movement of the optical pickup. Further, by the decrease in weight of the moving portion, its tracking sensitivity in the focusing direction can be improved.

Since the objective lens supporting device according to the present invention is balanced in the tracking direction, the objective lens can be controlled not to vibrate when the device is subjected to an external force due to an acceleration produced by the movement of the pickup. Therefore, an information signal can be written and/or read on an optical disk by the optical pickup device in a short time.

Since the tracking sensitivity can be improved, the device can cope with a high speed rotation of an optical disk and, therefore, good signal writing and/or reading can be achieved.

Since the tracking sensitivity can be improved, the device can achieve tracking adjustment for an optical disk having a greater facial warp or eccentricity and, therefore, good signal writing and/or reading can be achieved.

Since the tracking adjustment by driving with a small current is made possible, power consumption of the driving mechanism can be reduced.

Since the device is balanced in the tracking direction, the objective lens can be controlled not to vibrate when the device is subjected to an external force produced by movement, and since the need for an electric current for vibration control can be eliminated, power consumption of the drive mechanism can be reduced. Also other effects can be obtained.

What is claimed is:

1. An objective lens supporting device for an optical pickup capable of controlling drive of an objective lens supported on a moving portion in the tracking direction and in the direction of the optical axis of said objective lens, comprising:

a lens retaining member to retain said objective lens;

support means for supporting said lens retaining member for movement along the optical axis of said objective lens; and a supporting base to support said support means, said supporting base being rotatably supported on a bed plate by a hinge portion, and allowing said lens retaining member to move in the tracking direction;

wherein the center of gravity of the entire body of the moving portion supported by said hinge portion is positioned on the axial line of said hinge portion and the center of gravity of said lens retaining member is positioned on the optical axis of said objective lens.

2. An objective lens supporting device for optical pickup according to claim 1, wherein said support means for supporting said lens retaining member for movement along the optical axis of said objective lens has a plurality of plate-type resilient spring plates arranged in parallel and placed in planes parallel to the tracking surface, said spring plates supporting said lens retaining member at their one ends and being held by said supporting base at their other ends.

3. An objective lens supporting device for optical pickup according to claim 1, wherein said hinge portion is provided in a joint portion formed between and integrally with a connection base fixed on said bed plate and said supporting base being a portion of said moving portion.

4. An objective lens supporting device for optical pickup according to claim 1, wherein a joint portion including said hinge portion and said supporting base are integrally formed of a flexible synthetic resin.

5. An objective lens supporting device for optical pickup according to claim 1, wherein said hinge portion is linearly formed along a tangential line portion between an edge sharply projecting from said supporting base and said connection base.

6. An objective lens supporting device for optical pickup according to claim 1, wherein said supporting base is provided with a balancer whose weight can be increased or decreased for balance adjustment of the center of gravity for the tracking direction.

* * * * *

UNITED STATES PATENT AND TRADEMARK OFFICE
CERTIFICATE OF CORRECTION

PATENT NO. : 5,781,352

DATED : July 14, 1998

INVENTOR(S) : Ujiie et al.

It is certified that error appears in the above-identified patent and that said Letters Patent is hereby corrected as shown below:

Title Page, [75], change "Shizuoka" to --Iwata--;

Item: [73], change "Nagano" to --Kitasaku--.

Col. 1, line 44, change "direct ion" to --direction--.

Signed and Sealed this

Tenth Day of November 1998

Attest:

BRUCE LEHMAN

Attesting Officer     Commissioner of Patents and Trademarks